United States Patent
Fujimori

[11] Patent Number: 5,995,162
[45] Date of Patent: Nov. 30, 1999

[54] VIDEO DISPLAY APPARATUS AND METHOD FOR ADJUSTING PARAMETERS ON AN ON-SCREEN DISPLAY

[75] Inventor: Shin Fujimori, Tokyo, Japan

[73] Assignee: Sony Corporation, Tokyo, Japan

[21] Appl. No.: 08/739,542

[22] Filed: Oct. 30, 1996

[30] Foreign Application Priority Data

Nov. 2, 1995 [JP] Japan ................ P07-286081

[51] Int. Cl.[6] .......... H04N 17/00; H04N 17/02; H04N 5/50
[52] U.S. Cl. ............ 348/569; 348/177; 348/178
[58] Field of Search ................ 348/177, 178, 348/179, 180, 181, 184, 185, 189, 569, 563, 745, 806; H04N 5/50, 17/00, 17/02

[56] References Cited

U.S. PATENT DOCUMENTS

| | | | |
|---|---|---|---|
| 4,858,006 | 8/1989 | Suzuki et al. | 348/184 |
| 4,901,147 | 2/1990 | Tajima | 348/184 |

*Primary Examiner*—Michael H. Lee
*Attorney, Agent, or Firm*—Jay H. Maioli

[57] ABSTRACT

A display apparatus for displaying adjustment data for a video display on an on-screen display includes video signal processing circuitry, input circuitry for entering user adjustment data, a microcomputer for receiving the user adjustment data and for controlling the video signal processing circuitry based on the user adjustment data, a memory connected to the microcomputer for storing the user adjustment data and factory preset data for the video display, a display screen connected to the video signal processing circuitry, and an on-screen display portion for displaying the user adjustment data and the factory preset data simultaneously on the display screen. Also, a method for displaying a representation of user adjustment data simultaneously with a representation of factory preset adjustment data for a video display device, includes the steps of writing the factory preset adjustment data in a non-volatile memory section, receiving an input video signal for display on a video screen, receiving the representation of user adjustment data for a video display device parameter to be adjusted, writing the user adjustment data in another non-volatile memory section, generating an on-screen display video signal for displaying on a on-screen display portion of the video screen, thereby giving a user a reference adjustment position during the adjustment of the video display device parameter.

7 Claims, 6 Drawing Sheets

VIDEO DISPLAY APPARATUS AND METHOD FOR ADJUSTING PARAMETERS ON AN ON-SCREEN DISPLAY

BACKGROUND OF THE INVENTION

The present invention relates to a video display apparatus and method for use with, for example, a color television receiver or a multiscan computer monitor.

Currently there are computer monitors and television receivers which in addition to displaying an input video signal can display various monitor parameters that can be adjusted by displaying characters, numerals, graphics or a combination thereof. This capability to display the parameters to be adjusted is called "on-screen display" (hereinafter "OSD").

These video display devices having OSD capability are designed to allow the user to adjust parameters related to the video display operation. These parameters include the size and center position of the picture screen (raster) displayed upon under-scanning, the rotational distortion and the pincushion distortion of the screen resulting from geomagnetism, convergence, brightness, contrast and other parameters.

Such parameters are digitally adjusted by using operation keys for controlling the adjustment amount of the parameters. When these operation keys are used, graphs representing the current adjustments of the parameters are displayed and changed to reflect the new settings on the OSD portion of the display screen, thereby giving the user a visual feedback.

When the user adjusts the parameters, data indicating the adjusted amount is stored in a nonvolatile memory so that when the power supply is cycled the last adjusted parameters can be retrieved.

When parameters are adjusted as described above, a reference adjustment position for the parameter is not available. This lack of reference position creates a problem for the user by making it difficult to judge whether the current adjustment amount is proper or is too large or too small. Therefore, the user is forced to adjust the elements based on only a visual feedback of the screen leading to misadjustment and potential frustration of the user.

SUMMARY OF THE INVENTION

It is an object of the present invention to provide a display apparatus that displays a reference position for the adjustment of parameters concerning the display operation, thereby preventing misadjustment and potential frustration of the user from occurring.

It is another object of the present invention to provide a video display apparatus that displays on an on-screen display portion of a video screen the representation of video display parameters that can be user adjusted simultaneously with the representation of present values of the parameters which were set at the factory.

This and other objects, advantages, and features of the present invention will become apparent to those skilled in the art upon consideration of the following description of the present invention.

According to a first aspect of the present invention, a display apparatus for displaying adjustment data for a video display on an on-screen display includes video signal processing circuitry, input circuitry for entering user adjustment data, a microcomputer for receiving the user adjustment data and for controlling the video signal processing circuitry based on the user adjustment data, a memory connected to the microcomputer for storing the user adjustment data and factory preset data for the video display, a display screen connected to the video signal processing circuitry, and an on-screen display portion for displaying the user adjustment data and the factory preset data on the display screen.

According to a second aspect of the present invention, a method for displaying a representation of user adjustment data and a representation of factory preset adjustment data for a video display device, includes the steps of writing said factory preset adjustment data in a non-volatile memory section, receiving an input video signal for display on a video screen, receiving said representation of user adjustment data for a video display device parameter to be adjusted, writing said user adjustment data in another non-volatile memory section, generating an on-screen display video signal for displaying on a on-screen display portion of said video screen, wherein said on-screen display video signal includes said representation of said user adjustment data and said representation of factory preset adjustment data, thereby giving a user during the adjustment of the video display device parameter a reference adjustment position.

DETAILED DESCRIPTION OF THE INVENTION

While this invention is susceptible of embodiment in many different forms, there is shown in the drawings and will herein be described in detail specific embodiments, with the understanding that the present disclosure is to be considered as an example of the principles of the invention and is not intended to limit the invention to the specific embodiments shown and described. In the description below, like reference numerals are used to describe the same, similar or corresponding parts in the several views of the drawing.

The present invention will now be described with reference to the drawings.

Figure 1:
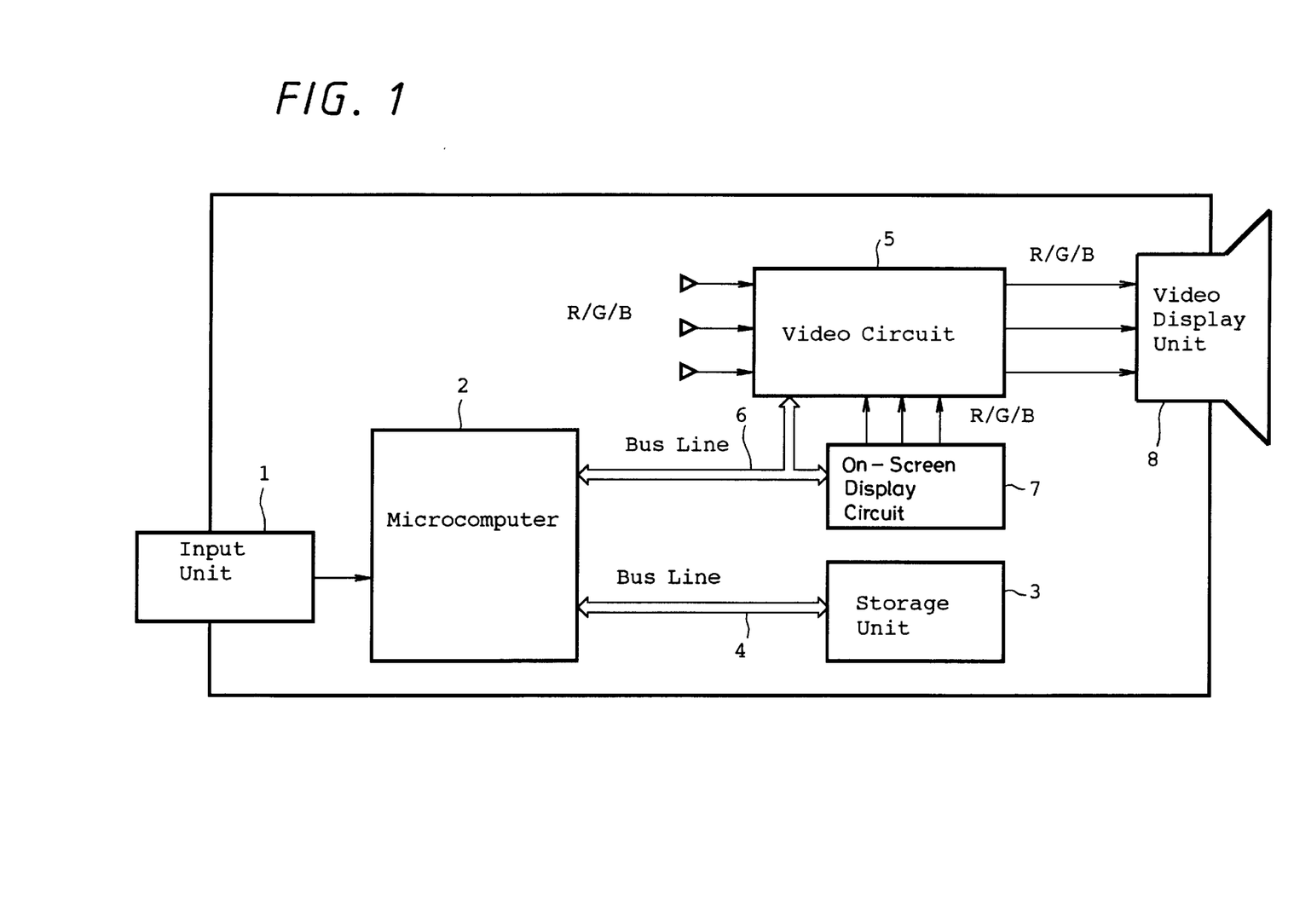
FIG. 1 is a schematic in block diagram form of a computer video monitor according to an embodiment of the present invention.

Now turning to FIG. 1, an input unit 1 includes a keyboard or a remote controller (not shown) used for inputting data. The input unit 1 supplies input data to a microcomputer 2 having a random-access memory (RAM) for storing data. A storage unit 3 is a nonvolatile memory and can store data even when the display apparatus is not energized. The data stored in the storage unit 3 is supplied to the microcomputer 2 through a bus line 4.

A video circuit 5 is supplied with R, G, B input video signals. The video circuit 5 adjusts the input video signals under the control of a signal supplied by the microcomputer 2 through a bus line 6. An on-screen display ("OSD") circuit 7 for displaying representations of adjustment data on a display screen of a video display unit 8 generates such OSD signals based on signals supplied from the microcomputer 2 through the bus line 6 under the control of the microcomputer 2. The OSD circuit 7 supplies the generated representation video signals (R/G/B) to the video circuit 5.

The video circuit 5 synthesizes the input video signals (R/G/B) and the representation video signals (R/G/B) to obtain synthesized video signals (R/G/B). These synthesized video signals (R/G/B) are supplied to a video display unit 8, which includes, for example, a cathode-ray tube (CRT), so that the display apparatus forms a display picture in which the representation of adjustment data generated by the OSD circuit 7 is superimposed on a picture obtained from the input video signals (R/G/B) supplied to the video circuit 5. When a user adjusts parameters by operating the keys provided in the input unit 1, a cursor on the OSD is correspondingly moved, thereby giving the user a visual feedback of the adjustment.

When the parameter adjustment is increased or decreased by using the operation keys of the input unit 1, the microcomputer 2 controls several of the devices making up the video display apparatus, as shown, including the video circuit 5. These devices then carry out various digital processing operations, for example, the OSD circuit 7 generates a signal representing the parameter under adjustment which is then displayed on the video display unit 8, thereby giving the user a visual feedback.

Figure 2:
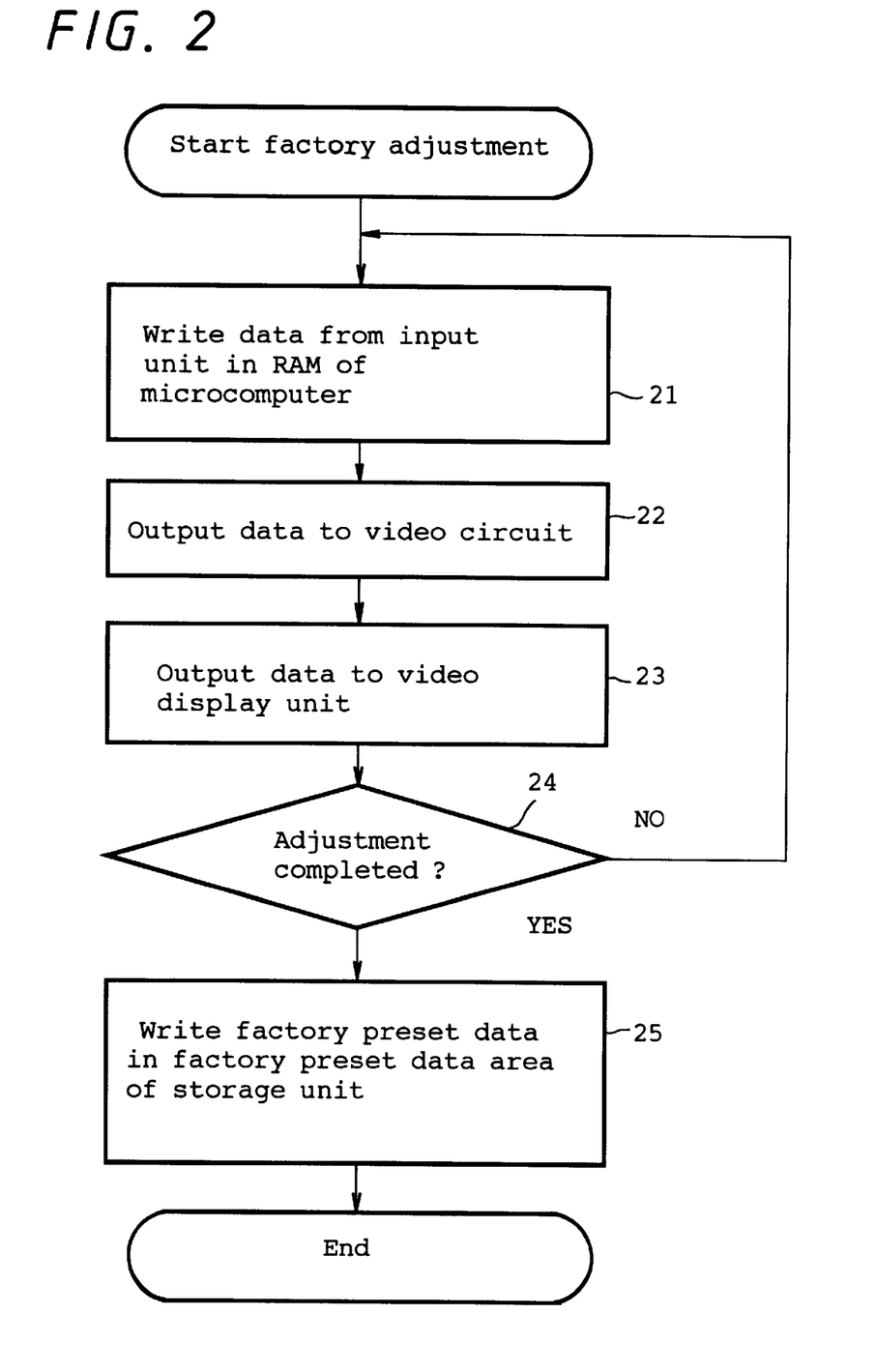
FIG. 2, FIG. 3, and FIG. 4 are flowcharts of the method for adjusting parameters according to an embodiment of the present invention.

Turning now to FIG. 2, the operations for writing in the storage unit 3 the factory adjusted preset data will be described. When the adjustment in the factory is started in step 21, an external unit (not shown) writes the adjustment data in the RAM provided in the microcomputer 2 through the input unit 1. Then, the processing proceeds to step 22 where the microcomputer 2 outputs the written adjustment data from its RAM to the video circuit 5. Next, the processing proceeds to step 23, where the video circuit 5 outputs signals to the video display unit 8, repeating the cycle until the data is set to an optimum value. The processing proceeds to step 24, where it is determined whether the adjustment is completed, if not, the processing returns to step 21. If on the other hand it is determined in step 24 that the adjustment is completed, the processing proceeds to step 25 where the adjustment data becomes the factory preset data, and is written in the factory-preset-data storage area of the storage unit 3 and the process is ended.

Figure 3:
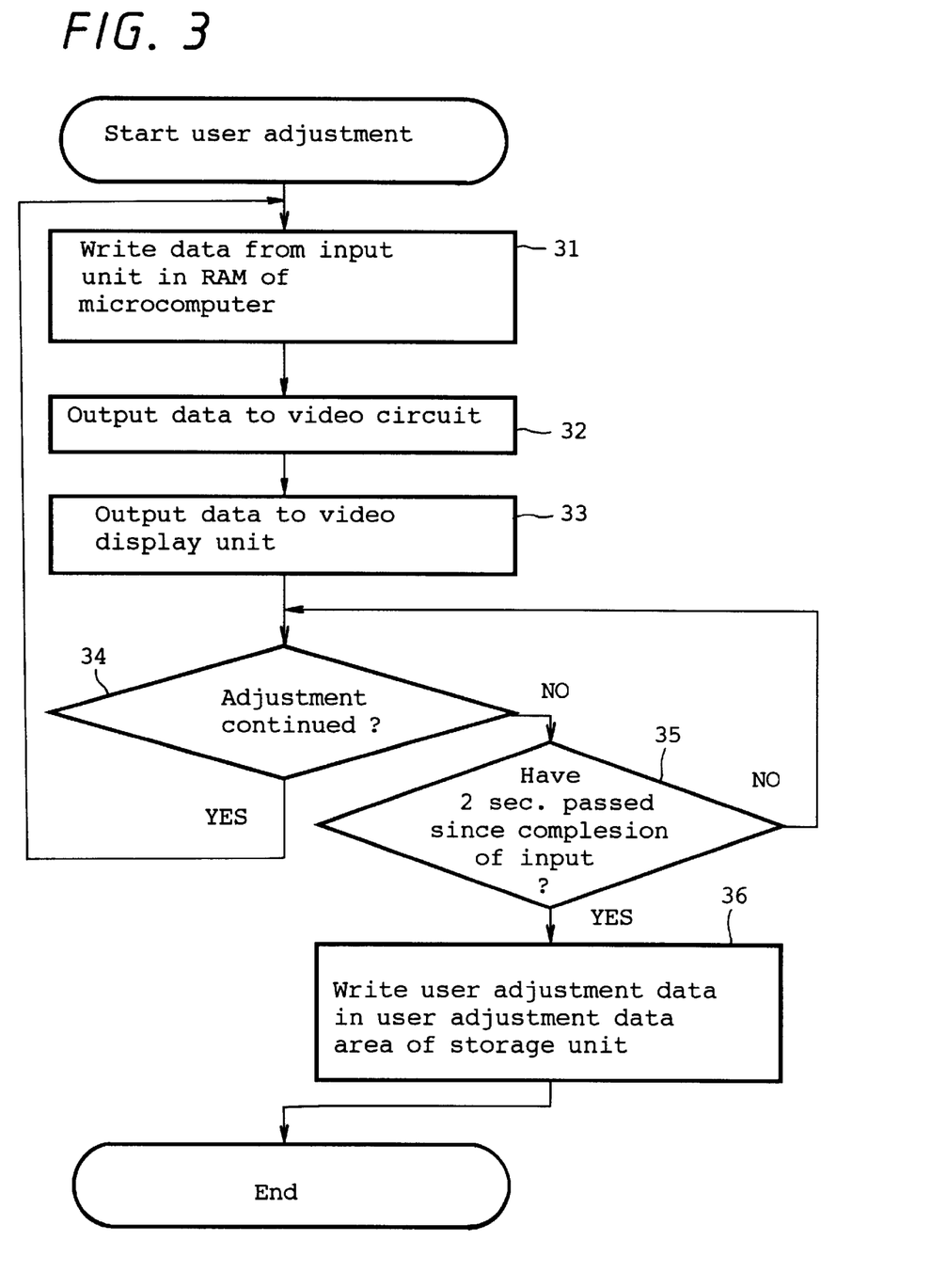

Turning now to FIG. 3 the operation for writing the adjustment data of the parameters set by the user into the storage unit 3 will be described. When the user starts adjusting the parameter data in step 31 by using the input unit 1, the user data is written in the RAM of the microcomputer 2. The processing proceeds to step 32 where the microcomputer 2 outputs the user adjustment data written in the RAM to the video circuit 5.

The processing proceeds to step 33, where the video circuit 5 outputs signals to the video display unit 8, thereby completing the first stage of this adjustment. Then, the processing proceeds to step 34 where it is determined whether the adjustment is to be continued. If it is determined in step 34 that the adjustment is continued, as represented by Yes, then the processing starts at step 31 again.

If, on the other hand, it is determined in step 34 that the adjustment is not continued, as represented by No, then the processing proceeds to step 35, where it is determined whether two seconds have passed since the end of the user input. If it is determined in step 35 that two seconds have not passed, as represented by No, then the processing returns to step 34. If, on the other hand, it is determined in step 35 that two seconds have passed as represented by Yes, then the processing proceeds to step 36 where the new user adjustment data is written in the user-adjustment-data storage area of the storage unit 3 and then the processing ends.

Figure 4:
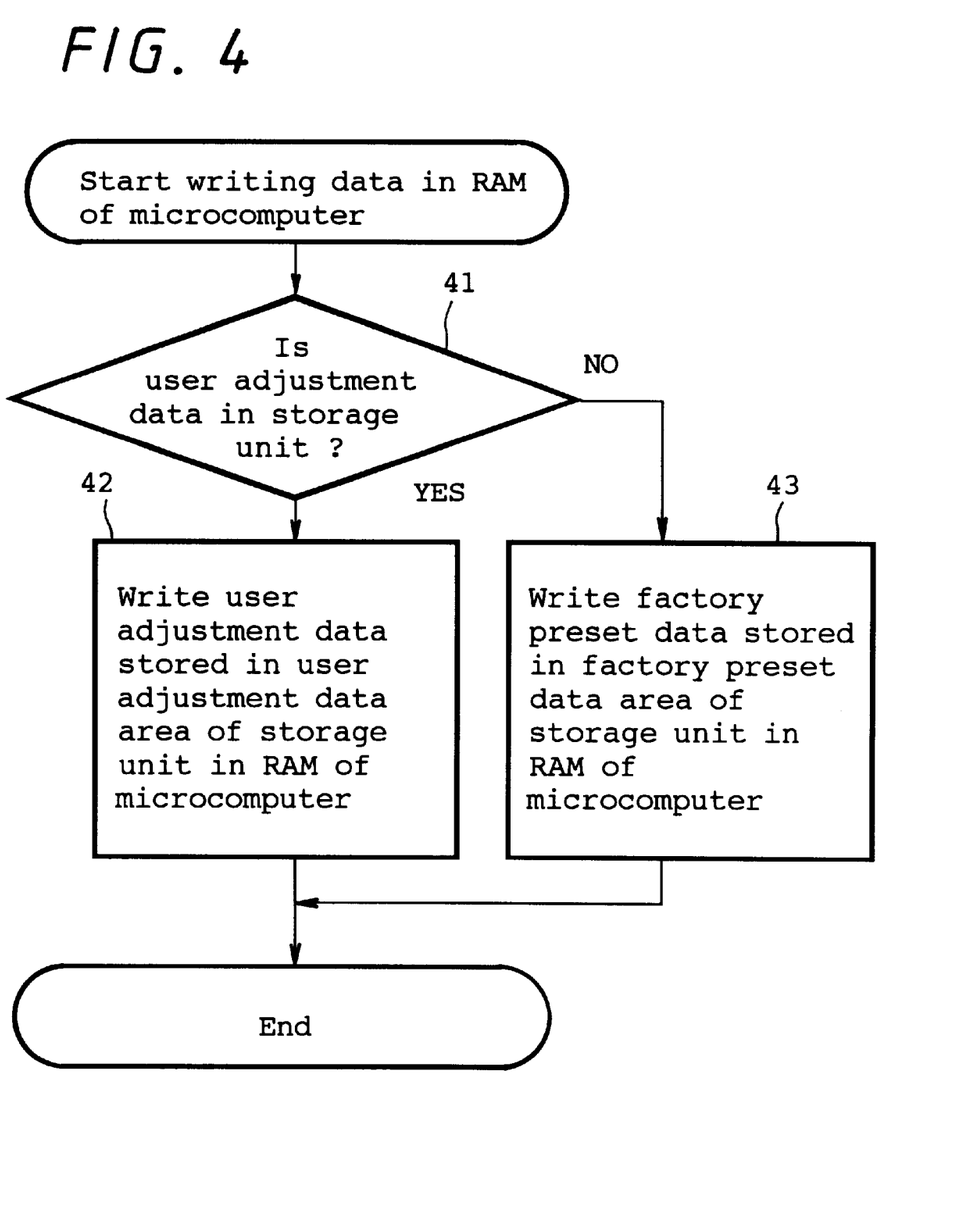

Turning now to FIG. 4, the operations carried out when the parameters are adjusted by using the user adjustment data in combination with the factory preset data written in the respective storage areas of the storage unit 3 will be described. Initially, when the parameters are adjusted by using the user adjustment data and the factory preset data written in their respective storage areas of the storage unit 3, the adjustment data is written in the RAM provided in the microcomputer 2.

When these operations are started, it is determined in step 41 whether the user adjustment data is stored in the user-adjustment-data storage area of the storage unit 3. If it is determined in step 41 that the user adjustment data is stored, as represented by Yes, then the processing proceeds to step 42 where the user adjustment data stored in the storage unit 3 is written in the RAM of the microcomputer 2 and then the processing ends.

If, on the other hand, it is determined in step 41 that the user adjustment data is not stored, as represented by No, the processing proceeds to step 43 where the factory preset data stored in the factory-preset-data storage area of the storage unit 3 is written in the RAM of the microcomputer 2 and then the processing also ends.

According to the display apparatus of the present invention, when the user adjusts the parameters the representations of the factory preset data for the respective adjustable parameters are displayed, thereby giving the user a visual feedback.

Figure 5A:
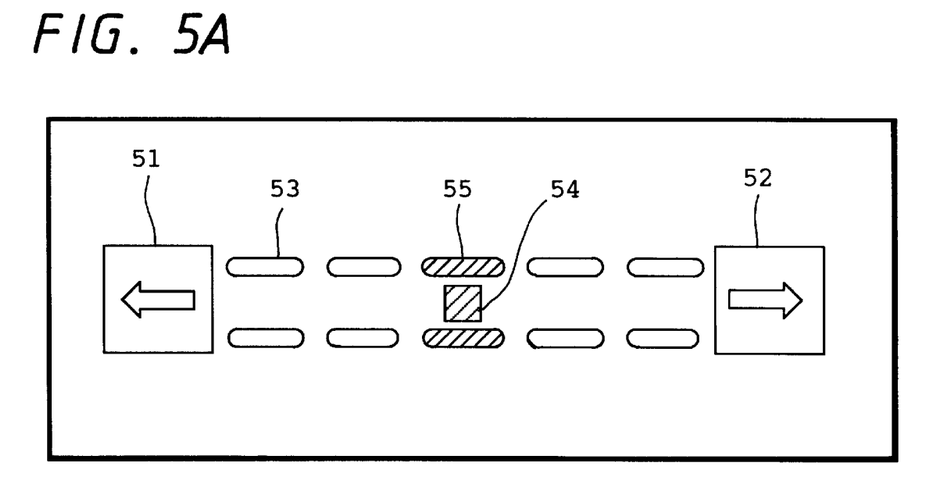
FIGS. 5A and 5B are pictorial representations of adjustment data displayed on the on-screen display of the display apparatus according to an embodiment of the present invention.
Figure 5B:
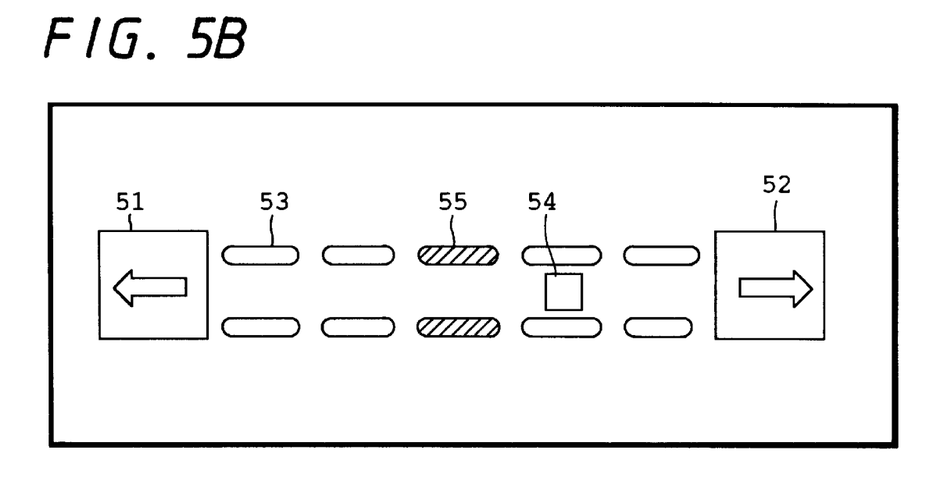

Turning now to FIGS. 5A and 5B showing the representations of the parameter adjustment, left and right direction arrows 51, 52 similar to markings on the operation keys are displayed at both ends of the representation on the screen to indicate the direction of the adjustment. A bar 53 is displayed therein between the above adjustment-direction arrows 51, 52. The bar 53 serves as a scale and has segments arranged in two upper and lower horizontal lines.

The value of the adjustment data, that is, the user adjustment data or the factory preset data, written in the RAM of the microcomputer 2 is read out. In response to the value of the adjustment data, a cursor 54 indicating the adjustment amount is displayed between the upper and lower segments of the bar 53. Therefore, when the adjustment data written in the RAM of the microcomputer 2 is changed, a displayed position of the cursor 54 is changed, as shown in FIG. 5B.

Together with the change of the displayed position of the cursor 54, the factory preset data stored in the factory-preset-data storage area of the storage unit 3 is read out by the microcomputer 2, and preset value markers 55 are displayed in response to the value of the adjustment data read out from the RAM. Specifically, the preset-value markers 55 indicating the value of the factory preset data are displayed by changing display colors of one pair of the upper and lower segments, corresponding to the factory preset data, of the bar 53.

Therefore, the display apparatus according to this embodiment of the present invention permits both the representation of the adjustment and the representation of the preset value of the factory preset data to be displayed simultaneously during adjustment.

In this embodiment of the present invention, each of the segments of the bar 53 which also serve as the preset-value marker 55 is displayed at a position whose horizontal direction length is one-fifth of the display area of the bars 53. The cursor 54 is displayed so as to move ten steps with respect to one segment of the bar 53. To prevent the cursor 54 from being moved out of the edge borders on the left and right end segments of the bar 53, however, the cursor 54 is displayed so as to move, for example, only seven steps with respect to each of the left and right end segments of the bar 53. Therefore, the cursor 54 is displayed so as to move forty-four steps with respect to all the segments of the bar 53 arranged in one line.

The user adjustment data of the adjustable elements can be adjusted usually in more steps than the number of steps of the cursor 54. To display at the display positions of one pair of the segments of the bar 53 the value of the factory preset adjustment data, which comprises a large number of steps, the display positions of the preset-value markers 55 can be determined by calculation using the following Equation (1).

$$Point = \frac{(2 * RealStep * Data) + (PotStep - RealStep) * DataMax}{(PotStep + RealStep) * DataMax} * BarSize \quad (1)$$

Figure 6:
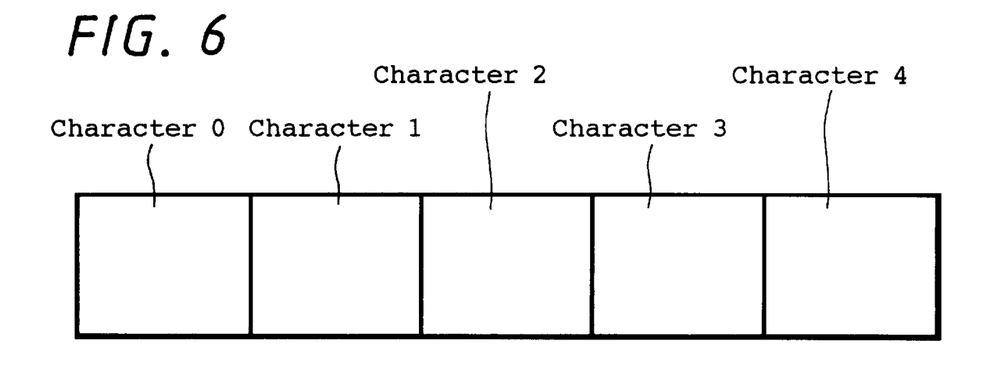
FIG. 6 is a diagram used to explain the representations of FIGS. 5A and 5B.

In Equation (1), positions of characters forming the bar 53 are represented as characters 0 to 4 as shown in FIG. 6. The characters 0 to 4 are similar to the segments of the bar 53 each of which is obtained by dividing the display area of the bar 53 into five equal parts. This Equation (1) is used to calculate a position (Point) of the character on which the preset-value marker 55 is to be displayed, the result is a number from 0 to 4. Next, the calculated position is corrected in consideration of the above-mentioned difference between the step numbers with respect to the segments of the bar 53 located at the left and right ends and the step numbers with respect to the segments of the bar 53 located in the middle positions.

In the above Equation (1), "Barsize" depicts the number of characters forming the bar 53, which is set to 5 in this embodiment, "Data" depicts a value of data written in the preset-value storage area of the storage apparatus 3, "DataMax" depicts a variable amount of the value, "RealStep" depicts an actual change amount of the cursor 54 in the representation of the adjustment, which is set to 44 steps in this embodiment, and "PotStep" depicts an assumed change amount of the cursor 54 or variable amount presented when every character has the same variable amount of data or 50 steps in this embodiment.

The microcomputer 2 calculates the Equation (1) by substituting these values for corresponding terms in the equation 1, thereby obtaining the position ("Point") of the character where the preset-value marker 55 should be displayed. The microcomputer 2 supplies the value of the "Point" to the OSD circuit 7 to determine the position of the preset value markers 55. Therefore, it is possible to display the preset value of the adjustment data set in the factory on the position of the proper segments of the bar 53 and to change the display color of the bar, thereby making it possible to properly display the preset-value markers 55.

Figure 7:
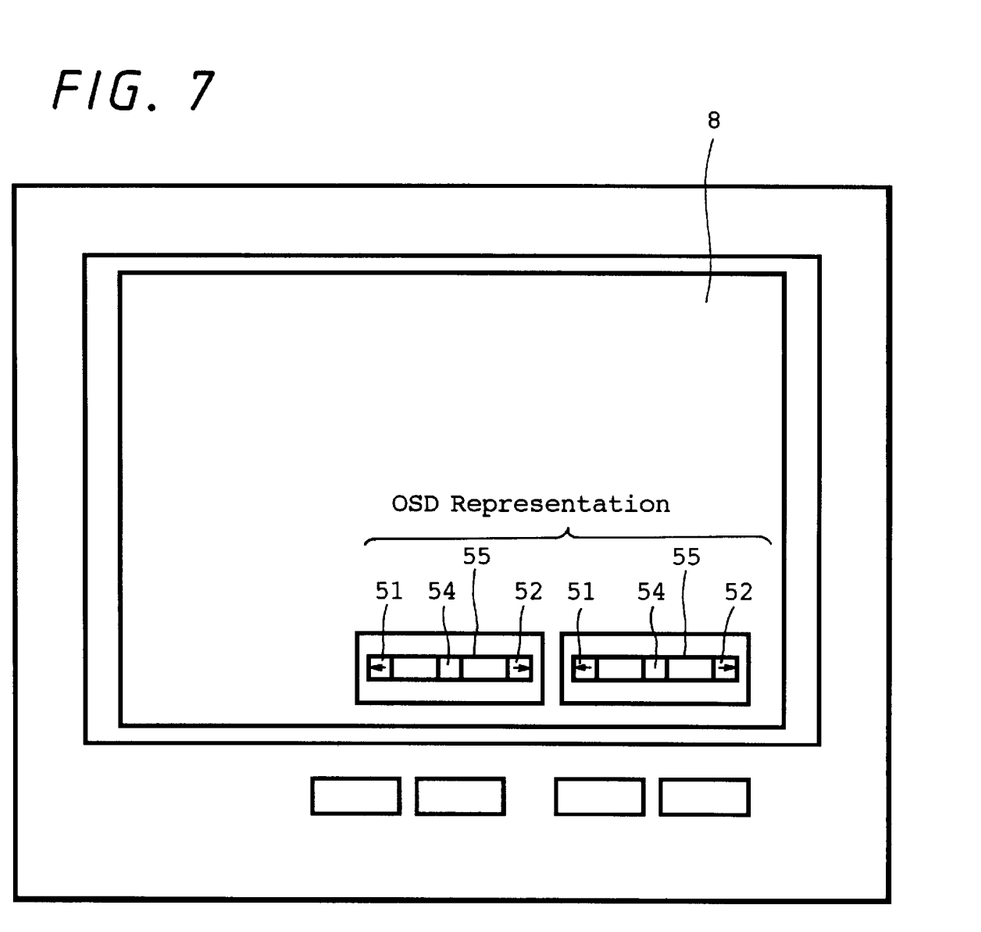
FIG. 7 is a front view of the video monitor showing another example of the representation of adjustment data displayed on the on-screen display of the display apparatus according to an embodiment of the present invention.

Now turning to FIG. 7, a diagram showing the display screen with the representation shown in FIGS. 5A and 5B displayed by the on-screen display function is shown. In FIG. 7, portions and units corresponding to those of FIG. 1 and FIGS. 5A and 5B are marked with the same reference numerals and therefore will not be described in detail.

According to this embodiment of the display apparatus of the present invention, the on-screen display function displays the representation for the adjustment of the adjustable parameter on the display screen along with the factory preset value of the adjustment data. Therefore, since the user has a reference position for the adjustment displayed on the screen, it becomes easier for the user to adjust the parameters.

Thus, it is apparent that in accordance with the present invention an apparatus and method that fully satisfy the objectives, aims, and advantages is set forth above. While the invention has been described in conjunction with specific embodiments, it is evident that many alternatives, modifications, permutations, and variations will become apparent to those skilled in the art in light of the foregoing description. Accordingly, it is intended that the present invention embrace all such alternatives, modifications and variations as fall within the scope of the appended claims.

What is claimed is:

1. An apparatus including factory preset data for a video display for displaying a representation of user adjustment data comprising:

video signal processing means for processing a video signal;

input means for receiving user adjustment data;

microcontroller means for controlling said video signal processing means based on said user adjustment data, wherein said microcontroller means is connected to said input means and to said video signal processing means;

memory means for storing said user adjustment data and said factory preset data for said video display, wherein said memory means is connected to said microcontroller means;

display means connected to said video signal processing means for displaying said video signal; and on-screen display means connected to said video signal processing means and to said microcontroller means for generating a representation in an individual display style of said factory preset data fed to said video signal processing means for display on said display means and for generating a representation in an individual display style of said user adjustment data fed to said video signal processing means for display on said display means superimposed on said display of said factory preset data, whereby a user visually compares an amount of said user adjustment data relative to said factory preset data.

2. The apparatus according to claim 1, in which said individual display style of said representation of user adjustment data includes a cursor and said individual display style of said representation of factory preset data includes a bar, wherein said cursor is movable along said bar.

3. The apparatus according to claim 2, in which said bar includes a plurality of segments linearly arranged.

4. The apparatus according to claim 3, in which said individual display style of said representation of factory preset data includes two bars sandwiching said cursor.

5. The apparatus according to claim 4, in which said on-screen display means displays a pair of arrows directed in opposite directions, wherein each of said pair of arrows is located at each respective end of said two bars.

6. The apparatus according to claim 3, in which said individual display style of said representation of factory preset data further includes displaying one of said plurality of segments in a different color than others of said plurality of segments.

7. A method for displaying a representation of user adjustment data on a video display device having factory preset data, comprising the steps of:

writing said factory preset adjustment data in a non-volatile memory section;

receiving an input video signal for display on a video screen;

receiving said user adjustment data for a video display device parameter to be adjusted;

writing said user adjustment data in another non-volatile memory section; and generating an on-screen display video signal for display on an on-screen display portion of said video screen, wherein said on-screen display video signal includes a representation in an individual display style of factory preset adjustment data an includes a representation in an individual display style of said user adjustment data superimposed on said representation of said factory preset data, thereby providing to a user a visual comparison of an amount of said user adjustment data relative to said factory preset data during the adjustment of the video display device parameter.

* * * * *